3,163,579
METHOD FOR THE ENTRAPMENT OF CHOLINE SALTS
Albert T. Derivan, Dunellen, N.J., assignor to National Starch and Chemical Corporation, New York, N.Y., a corporation of Delaware
No Drawing. Filed Feb. 15, 1962, Ser. No. 173,366
5 Claims. (Cl. 167—82)

This invention relates to a method for the entrapment of choline salts as well as to the novel compositions thereby prepared.

It is the prime object of this invention to provide a method for entrapping choline salts so as to convert the latter into a form wherein their inherent deliquescence is substantially reduced, if not entirely eliminated. A further object of this invention involves the use of such entrapped choline salts for medicinal purposes or as dietary supplements for both humans or animals, said supplements being capable of utilization either alone or in combination with feed mixtures. Various other objects and advantages of this invention will be apparent from the following description.

The salts of (beta-hydroxyethyl) trimethylammonium hydroxide, commonly referred to as choline, are finding ever increasing usage in such applications as animal dietary supplements and as medications or food supplements for humans. These salts have been found to play a vital role in both human and animal nutrition, particularly in the liver and kidney wherein they act to prevent the deposition of excessive amounts of fat which would otherwise interfere with the normal function of these important filtration organs. Thus, a marked deficiency in the choline which is derived from these salts will ultimately result in reduced growth, poor utilization of nutrients, lower egg production in the case of poultry, and generally poor health. Among animals the effects of such a choline deficiency have been observed in calves, feeder cattle, swine and poultry. In humans the medicinal applications of choline salts have been directed, for the most part, towards the treatment of various liver diseases such as cirrhosis.

In providing animals with these choline salts, the latter have usually, heretofore, been admixed with an inert carrier derived from such materials as ground corn cobs or corn meal; said carrier serving, in effect, as an absorbent for the salt. These mixtures are then added to, or combined with, the regular feed mix which is supplied to these animals. Unfortunately, the use of this technique has proven to be rather inadequate. Essentially, the problems which have arisen with the use of these food supplements in this absorbed form are the result of the highly deliquescent nature of the choline salts which makes them very difficult either to handle or uniformly distribute within any given feed mix without the use of special equipment. These salts are of such extreme deliquescence that they cannot be exposed to air and must be maintained in tightly stoppered containers.

Thus, when these salts are to be admixed with, or absorbed upon, an inert carrier, they are ordinarily applied to the latter from their aqueous solutions. Upon drying, the resulting products are still found to suffer from the deliquescence which is characteristic of these choline salts. However, when absorbed upon these ground corn cob or corn meal carriers, this deliquescence now manifests itself in the form of a highly objectionable tackiness on the part of the composite product. Needless to say, this tackiness detracts from both the desirability as well as from the utility of any animal feed mixture with which these absorbed choline salts may be blended. These same difficulties, stemming from the deliquescent nature of choline salts, have also hindered their use in either dietary or medicinal applications for the treatment of humans.

I have now discovered a means by which choline salts may be converted into an easily handled form wherein they display little or no deliquescence and may thus be readily and effectively employed for medicinal purposes and as dietary supplements for use either alone or in combination with animal feed mixes.

In brief, the process of my invention involves the entrapment of choline salts in gels derived from certain starches having specific gel forming characteristics. These choline salt containing gels, as prepared by means of the process of my invention, are non-toxic, and fully digestible and are found to exhibit a most surprising degree of freedom from the extreme deliquescence which is normally characteristic of choline salts. Moreover, my compositions are readily comminuted and are thus easily blended with animal feeds or compressed into tablets, or other desired forms, which may be used in medicinal or dietary applications for either animals or humans.

Among the various choline salts which are applicable to the process of my invention, one may list choline bicarbonate, choline borate, choline ascorbate, choline gluconate, choline theophyllinate, choline chloride, choline chloride carbamate, choline dihydrogen citrate, choline tricitrate, and choline bitartrate. However, from among the latter salts, as well as from among the many other choline salts which may be synthesized, it is the chloride salt which, as a result of its lower cost, high choline content, and ease of digestibility, is ordinarily utilized in most dietary and medicinal applications.

As for the starches which may be used for the entrapment of these choline salts, it is possible to employ any starch, starch fraction, and starch conversion product, or any derivative of such materials which yield gels having a minimum gel strength of 100 grams as determined by means of the subsequently described testing procedure. In this testing procedure, a strip of a choline salt containing gel having a choline salt content of 49%, by weight, on a dry basis and whose dimensions may range from 0.1"–0.2" in thickness and from 0.75"–1.0" in both length and width is tested at 72° F., with a Bloom Gelometer having a plunger diameter of 0.513 inch, as manufactured by the Precision Scientific Co., of Chicago, Ill. Under these conditions, it will require the addition to the plunger of a weight of at least 100 grams so as to achieve a penetration of the plunger into the gel of a distance of 0.051 inch. For purposes of brevity, it is to be understood that the minimum gel strength of the choline salt containing gels derived from the starch products applicable for use in my process will, in this disclosure, be expressed simply as 100 grams, i.e., their minimum gel strength is 100 grams.

The practitioner may thus utilize starches derived from such sources as corn, wheat, potatoes, tapioca, sago, arrowroot, rice, sorghum, and high amylose corn. Applicable conversion products derived from these starch bases would include, for example, dextrines prepared by acid and/or heat hydrolysis; oxidized starches prepared by treatment with oxidants such as sodium hypochlorite; and fluidity or thin boiling starches prepared by enzyme conversion or mild acidic hydrolysis. Applicable derivatives of the above starch bases and their conversion products would include various esters and ethers which can be prepared by reaction of the selected starch base or conversion product with the appropriate esterification or etherification reagent. Of particular interest for use in the process of my invention is the linear amylose fraction of starch, which may be separated from any of the above noted starch bases, as well as the previously mentioned high amylose corn starch. The latter designation, i.e., "high amylose," being assigned to starch having an amylose content of at least 55%, by weight. It is to be noted that the use in my process of either the separated amylose fraction or the high amylose corn starch is favored since the gels derived from these materials, as well as their ether or ester derivatives, have been found to display exceedingly high gel strengths when compared, on an equivalent weight basis, to the other starches and starch products which are applicable for use in the entrapment of choline salts. In any event, it should be emphasized at this point that the process of my invention is not dependent upon the use of any particular starch, starch fraction, starch conversion product, or derivative provided that the selected gel forming agent is capable of providing a gel having at least the above described minimum standards of gel strength.

The actual entrapment of choline salts, according to the process of my invention, may be carried out in the following maner. An aqueous mixture of the choline salt along with the selected starch gel forming agent is first mechanically agitated until it is noted that the gel forming agent is uniformly dispersed within the aqueous solution of the choline salt. The formation of a colloidal suspension or gel of the starch within the aqueous choline salt solution is then prepared by heating this dispersion. The precise heating conditions will be found to vary according to the specific gel forming agent which is being utilized. Thus, with the exception of amylose and high amylose starches, the dispersions containing any of the other starches, starch conversion products and their derivatives, including the derivatives of amylose and high amylose starch, may be gelled at temperatures within the range of about 180°–210° F. which may be applied for periods of from 10 to 30 minutes until the starch is gelatinized. On the other hand, gelling conditions for the amylose and high amylose starches require the application of temperatures in the range of about 350°–475° F., the latter temperatures being attainable under absolute steam pressures of about 135–540 pounds per square inch (p.s.i.) which may be applied in autoclaves or similar pressure reactors for periods of from 10 to 30 minutes.

Following the gelation of the dispersion, it is necessary to effect the drying of the resulting gel. This drying process is simplified in the case of those gels derived from amylose or high amylose starches since, when such gels are removed from the high pressure reactors wherein they were prepared, some of the water which is present in these gels is simultaneously flashed off, i.e., evaporated. However, with those gels which are prepared at atmospheric pressure, it is necessary to allow for their air drying for longer periods which may range from about 3 to 72 hours. Although other drying methods may be used, I have found that gels of maximum strength and hardness are, in fact, produced by the utilization of prolonged air drying conditions.

With either of the above noted gelation methods, it will be noted that the final products resulting from the process of my invention are found to be hard, rigid gels containing the choline salts entrapped therein. These gels may then be comminuted by any cutting or grinding means whose use is preferred by the practitioner. A mesh size of approximately #10, as measured on U.S. Standard Screen sieves, has been found to be suitable for most applications. In all cases, moreover, the products of my novel process will be found to display a complete absence of the extreme deliquescence which is characteristic of choline salts.

With respect to proportions, the initial aqueous dispersions may contain from about 5–50%, by weight, of the selected starch gel forming agent. Within this range, it should be noted that amylose and high amylose starches should be present in a concentration of from 5–20%, by weight, whereas the various other starches and starch products, including derivatives of amylose and high amylose starch, are usually employed in concentrations of from 25–40%, by weight. The amount of choline salt which can be entrapped by means of the process of my invention may range from any desired minimum concentration up to a maximum amount of about 70%, by weight, as based upon the final total weight of the resulting gel.

In using the entrapped choline salts resulting from the process of my invention, they may, in their comminuted form, be admixed or otherwise blended with any desired animal feed formula. Or, they may be used in an uncombined state, either without further processing, or by being converted into an appropriate dosage form such as by being compressed into pills or tablets, or by being contained within a capsule or other suitable dispensing means.

The following examples will further illustrate the process of my invention. In these examples, all parts given are by weight unless otherwise noted.

*Example I*

This example illustrates the entrapment of choline salts in amylose gels by means of the process of my invention.

A mixture comprising 2.5 parts of choline chloride, 1.0 part of amylose and 1.5 parts of water was mechanically agitated for 2–3 minutes so as to result in the uniform dispersal of the amylose within the aqueous choline chloride solution. This dispersion was then gelled by being placed into a high pressure reactor and heated for 20–25 minutes at a temperature of 350° F. and an absolute steam pressure of 135 p.s.i. Upon being removed from the pressure vessel, water was flashed off from the gel which was then air dried at 72° F. for a period of 1 hour. The resulting gel, which was completely free of any deliquescence, was found to be hard and tough, having a gel strength well above the required minimum of 100 grams, as determined by means of the earlier described testing procedure.

The above described dried gel was then ground to a #10, U.S. Standard Screen, mesh size whereupon it was blended with a poultry feed mix which again displayed a complete absence of any deliquescence. In comparison, it was noted that a mixture comprising 37.5%, by weight, of choline chloride absorbed on a corn meal carrier was extremely tacky as a result of the continued deliquscence of the choline chloride which was practically uneffected by the presence of the corn meal carrier.

The following table provides data relating to the composition of additional amylose-choline salt gels which were prepared by means of the above described procedure. These gels were all comparable in their properties and absence of deliquescence to the above described gel and each had a gel strength well above the required minimum of 100 grams, as determined by means of the earlier described testing procedure.

| Gel No. | Parts Amylose | Choline Salt | Parts Choline Salt | Parts $H_2O$ |
|---|---|---|---|---|
| 1 | 1.0 | Choline chloride | 10.0 | 9.0 |
| 2 | 1.0 | ----do---- | 5.0 | 4.0 |
| 3 | 1.0 | ----do---- | 3.2 | 2.4 |
| 4 | 1.0 | Choline bicarbonate | 4.0 | 5.0 |
| 5 | 1.0 | ----do---- | 1.7 | 2.2 |

*Example II*

This example illustrates the entrapment of choline salts in high amylose corn starch gels by means of the process of my invention.

A mixture comprising 2.3 parts of choline chloride, 2.2 parts of a high amylose corn starch having an amylose content of 55%, by weight, and 1.0 part of water was mechanically agitated for 2–3 minutes so as to result in the uniform dispersal of the high amylose corn starch within the aqueous choline chloride solution. This dispersion was then gelled by being placed into a high pressure reactor and heated for 20–25 minutes at a temperature of 350° F. and an absolute steam pressure of 135 p.s.i. Upon being removed from the pressure vessel, water was flushed off from the gel which was then air dried at 72° F. for a period of 10 hours. The resulting gel, which was completely free of any deliquescence, was found to be hard and tough, having a gel strength well above the required minimum of 100 grams, as determined by means of the earlier described testing procedure.

The above described dried gel was then ground to a #10, U.S. Standard Screen, mesh size whereupon it was blended wtih a cattle feed mix which again displayed a complete absence of any deliquescence.

The following table provides data relating to the composition of high amylose corn starch-choline salt gels which were prepared by means of the above described procedure. These gels were all comparable in their properties and absence of deliquescence to the above described gel and each had a gel strength well above the required minimum of 100 grams, as detrmined by means of the earlier described testing procedure.

| Gel No. | Parts High Amylose Starch | Choline Salt | Parts Choline Salt | Parts H₂O |
|---|---|---|---|---|
| 1 | ¹1.0 | Choline chloride | 5.0 | 4.0 |
| 2 | ¹1.0 | do | 3.2 | 2.4 |
| 3 | ¹1.0 | do | 2.5 | 1.5 |
| 4 | ¹1.0 | do | 2.0 | 1.0 |
| 5 | ¹1.4 | do | 2.3 | 1.0 |
| 6 | ¹1.8 | do | 2.4 | 1.0 |
| 7 | ²1.0 | do | 10.0 | 9.2 |
| 8 | ²1.0 | do | 2.5 | 1.5 |

¹ Hig hamylose starch containing 55%, by weight, of amylose.
² Hig hamylose starch containing 75%, by weight of amylose.

*Example III*

This example illustrates the entrapment of choline salts in various starch, starch derivative, amylose derivative, and high amylose starch derivative gel forming agents by means of the process of my invention.

A mixture comprising 2.2 parts of choline chloride, 2.2 parts of an oxidized sago starch prepared by treatment of sago starch with an aqueous sodium hypochlorite solution, and 1.0 part of water was mechanically agitated for 2 to 10 minutes so as to result in the uniform dispersal of the oxidized sago starch within the aqueous choline chloride solution. This dispersion was then gelled by being heated at 185° F. for about 20–30 minutes. The gelled dispersion was then air dried, at 72° F. for a period of 24 hours. The resulting dried gel, which was completely devoid of deliquescence, was found to be hard and tough, having a gel strength well above the required minimum of 100 grams, as determined by means of the earlier described testing procedure.

The above described gel was then ground to a #10, U.S. Standard Screen, mesh size, whereupon it was loaded into gelatine capsules intended for use as human dietary supplements.

The following table provides data relating to the composition of a number of entrapped choline salts prepared with a variety of starch, starch derivative, amylose derivative, and high amylose starch derivative gel forming agents by means of the above described procedure. These gels were all comparable in their properties and absence of deliquescence to the above described gel and each had a gel strength well above the required minimum of 100 grams, as determined by means of the earlier described testing procedure.

| Gel No. | Gel Forming Agent | Parts Gel Forming Agent | Choline Salt | Parts Choline Salt | Parts H₂O |
|---|---|---|---|---|---|
| 1 | Oxidized sago starch | 1.0 | Choline chloride | 2.5 | 1.5 |
| 2 | do | 1.0 | do | 2.0 | 1.0 |
| 3 | do | 1.4 | do | 2.3 | 1.0 |
| 4 | do | 1.8 | do | 2.4 | 1.0 |
| 5 | Corn starch | 1.0 | do | 2.0 | 1.0 |
| 6 | do | 1.4 | do | 2.3 | 1.0 |
| 7 | do | 1.8 | do | 2.4 | 1.0 |
| 8 | do | 2.2 | do | 2.3 | 1.0 |
| 9 | 60 fluidity corn starch ¹ | 1.0 | do | 2.5 | 1.5 |
| 10 | do.¹ | 1.0 | do | 2.0 | 1.0 |
| 11 | do.¹ | 1.4 | do | 2.3 | 1.0 |
| 12 | do.¹ | 1.8 | do | 2.4 | 1.0 |
| 13 | do.¹ | 2.2 | do | 2.3 | 1.0 |
| 14 | 20 fluidity corn starch ² | 1.0 | do | 3.2 | 2.4 |
| 15 | do.² | 1.0 | do | 2.5 | 1.5 |
| 16 | do.² | 1.0 | do | 2.0 | 1.0 |
| 17 | do.² | 1.4 | do | 2.3 | 1.0 |
| 18 | do.² | 1.8 | do | 2.4 | 1.0 |
| 19 | do.² | 2.2 | do | 2.3 | 1.0 |
| 20 | Oxidized sago starch | 1.0 | Choline bicarbonate | 1.7 | 2.2 |
| 21 | do | 1.0 | do | 1.8 | 2.2 |
| 22 | Corn starch | 1.5 | do | 1.0 | 1.4 |
| 23 | do | 1.0 | do | 1.8 | 2.2 |
| 24 | Amylose acetate ³ | 1.8 | Choline chloride | 2.2 | 1.0 |
| 25 | do.³ | 1.0 | do | 2.5 | 1.0 |
| 26 | Corn starch octenyl succinate ester ⁴ | 1.0 | do | 2.0 | 1.0 |
| 27 | do.⁴ | 2.2 | do | 2.3 | 1.0 |
| 28 | do.⁴ | 1.0 | Choline cicarbonate | 1.2 | 1.7 |
| 29 | Beta-diethyl amino ethyl chloride hydrochloride corn starch ether.⁵ | 1.0 | Choline chloride | 2.0 | 1.0 |
| 30 | do.⁵ | 2.2 | do | 2.0 | 1.0 |
| 31 | High amylose starch octenyl succinate ester.⁶ | 1.0 | do | 1.8 | 1.0 |
| 32 | do.⁶ | 2.2 | do | 2.0 | 1.0 |
| 33 | Beta-diethyl amino ethyl chloride hydrochloride amylose ether.⁷ | 1.0 | do | 1.8 | 1.0 |

¹ A thin boiling starch prepared by the mild acid hydrolysis of corn starch to a degree known in the trade as 60 fluidity.
² A thin boiling starch prepared by the mild acid hydrolusis of corn starch to a degree known in the trade as 20 fluidity.
³ An amylose acetate ester prepared by reaction of amylose with acetic anhydride, said ester having an acetate content of 4% by, weight.
⁴ An octenyl succinate ester of corn starch prepared by reacting corn starch with octenyl succinic acid anhydride, 3%, by wt. on starch solids, according to the procedure described in Example II of U.S, Patent 2,661,349.
⁵ A beta-diethyl amino ethyl chloride hydrochloride ether of corn starch prepared by reacting corn starch with beta-diethyl amino ethyl hydrochloride, 3%, by wt., on starch solids, according to the procedure described in Example I, of U.S. Patent 2,813,093.
⁶ An octenyl succinate ester of a high amylose corn starch having an amylose content of 55%, by weight, prepared by reacting the high amylose corn starch with octenyl succinic and anhydride, 3%, by wt. on starch solids, according to the procedure described in Example II of U.S. Patent 2,661,349.
⁷ A beta-diethyl amino ethyl chloride hydrochloride ether of amylose prepared by reacting amylose with beta-diethyl amino ethyl hydrochloride, 3%, by wt., on amylose solids, according to the procedure described in Example I, of U.S. Patent 2,813,093.

Summarizing, my invention is thus seen to provide the practitioner with a novel method for the entrapment of choline salts in various starch and amylose gel forming agents. The resulting compositions are found to be free from the extreme deliquescence which is characteristic of such choline salts and thus permits these gels to be readily utilized as dietary supplements and for medicinal purposes. Variations may be made in proportions, procedures and materials without departing from the scope of this invention as defined by the following claims.

I claim:

1. A composition of matter comprising a dry gel having a choline salt entrapped within said gel, said gel being selected from the group consisting of starches, starch conversion products, oxidized starches, thin boiling starches, starch derivatives, amylose, amylose derivatives, high amylose starches and high amylose starch derivatives.

2. A composition of matter comprising comminuted particles of a dry gel having a choline salt entrapped within the dry gel particles, said gel being selected from the group consisting of starches, starch conversion products, oxidized starches, thin boiling starches, starch derivatives, amylose, amylose derivatives, high amylose starches and high amylose starch derivatives.

3. The composition of claim 1 in which the choline salt is choline chloride.

4. The method of entrapping a choline salt which comprises gelatinizing and dispersing a gel forming agent in an aqueous solution of a choline salt and gelling the resulting dispersion, said gel forming agent being selected from the group consisting of starches, starch conversion products, oxidized starches, thin boiling starches, starch derivatives, amylose, amylose derivatives, high amylose starches and high amylose starch derivatives.

5. The method of entrapping a choline salt which comprises gelatinizing and dispersing a gel forming agent in an aqueous solution of a choline salt, gelling the resulting dispersion by the application of heat thereto, and then drying the resultant choline entrapped gel, said gel forming agent being selected from the group consisting of starches, starch conversion products, oxidized starches, thin boiling starches, starch derivatives, amylose, amylose derivatives, high amylose starches and high amylose starch derivatives.

References Cited in the file of this patent
UNITED STATES PATENTS
2,879,161    Valentine et al. _____ Mar. 24, 1959